US008744094B2

(12) United States Patent
Poulsen et al.

(10) Patent No.: US 8,744,094 B2
(45) Date of Patent: Jun. 3, 2014

(54) ELECTRONIC DEVICE WITH INCREASED IMMUNITY TO AUDIO NOISE FROM SYSTEM GROUND CURRENTS

(75) Inventors: Jens Kristian Poulsen, Kitchener (CA); Yong Zhang, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 459 days.

(21) Appl. No.: 13/088,492

(22) Filed: Apr. 18, 2011

(65) Prior Publication Data

US 2012/0263316 A1 Oct. 18, 2012

(51) Int. Cl.
*H04B 15/00* (2006.01)
*H04R 1/10* (2006.01)

(52) U.S. Cl.
USPC ............................ 381/94.6; 381/74; 381/94.5

(58) Field of Classification Search
USPC .................. 381/86, 94.6, 123, 71.4, 93, 94.5; 327/407; 320/111
See application file for complete search history.

(56) References Cited

U.S. PATENT DOCUMENTS 5,751,823 A 5/1998 Strickland et al.
7,769,187 B1 * 8/2010 Farrar et al. .................... 381/74
8,452,024 B2 * 5/2013 Baranwal et al. ............... 381/74
2002/0186853 A1 12/2002 Anderson

OTHER PUBLICATIONS

European Patent Office, Extended European Search Report for European Patent Application Serial No. 11162808.7 dated Oct. 7, 2011.
European Patent Office, Decision to Grant, for European Patent Application Serial No. 11162808.7 dated Aug. 8, 2013.
European Patent Office, Extended European Search Report for European Patent Application Serial No. 13174132.4 dated Aug. 30, 2013.

* cited by examiner

*Primary Examiner* — Xu Mei
*Assistant Examiner* — Ammar Hamid
(74) *Attorney, Agent, or Firm* — Bereskin & Parr LLP

(57) ABSTRACT

According to some aspects, an electronic device adapted to provide audio output via an audio system. The electronic device includes an audio jack adapted to be coupled to the audio system. The audio jack includes a line-out for sending audio signals to the audio system and a ground return line. The electronic device also includes a ground resistor between the ground return line and a ground node. The ground resistor has a resistance selected to reduce ground current on the ground return line when the electronic device is being charged without significantly adversely affecting the quality of the audio output.

23 Claims, 3 Drawing Sheets

ELECTRONIC DEVICE WITH INCREASED IMMUNITY TO AUDIO NOISE FROM SYSTEM GROUND CURRENTS

FIELD

Embodiments described herein relate to electronic devices, and in particular to electronic devices adapted to increase immunity towards noise when outputting audio over an audio system.

INTRODUCTION

Portable electronic devices have gained widespread use and may provide a variety of functions including audio and video playback, telephonic, electronic text messaging and other application functions.

Portable electronic devices can include several types of devices, including cellular phones, smart phones, personal digital assistants (PDAs), music players, portable televisions or DVD players, tablets and laptop computers. Many of these devices are handheld, that is, they are sized and shaped to be held by a person or carried in a human hand.

Some portable electronic devices are used to provide audio output through an audio system, such as an audio system installed in a motor vehicle. For example, audio from music, movies or telephone calls may be routed from the electronic device to an audio system (e.g., a car stereo system) in a motor vehicle by connecting the electronic device to the audio system. Furthermore, some motor vehicles allow a portable electronic device's portable power supply, such as a rechargeable battery, to be charged during audio output, for example, by using a charging accessory such as a car charger.

BRIEF DESCRIPTION OF THE DRAWINGS

Embodiments of the present disclosure will now be described, by way of example only, with reference to the attached figures, in which.

DETAILED DESCRIPTION

Figure 1:
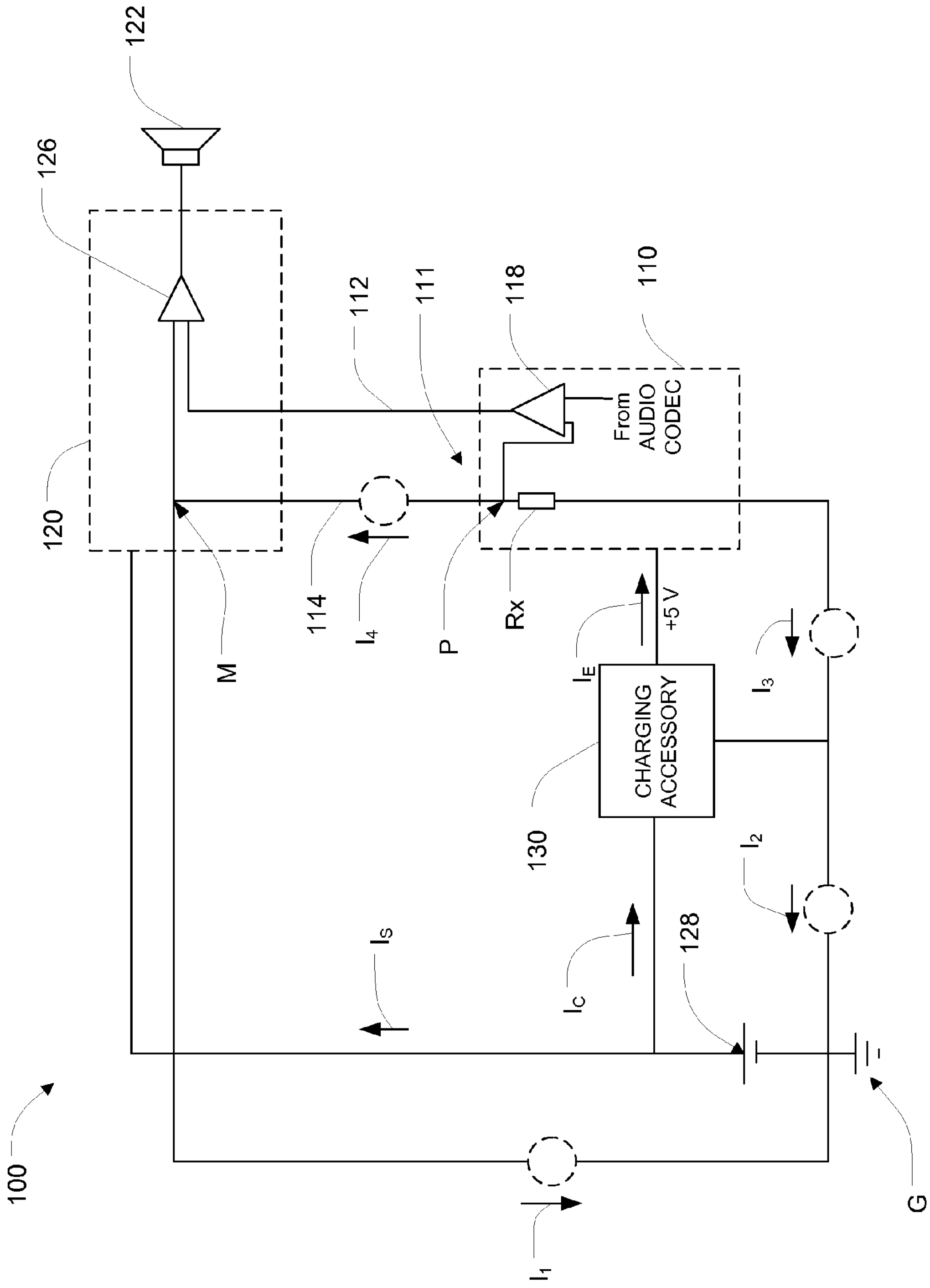
FIG. 1 is a circuit model diagram of an audio system including a portable electronic device, a charging accessory and a stereo system according to one embodiment, with one channel of the stereo system shown for clarity.

As introduced above, electronic devices may be adapted to provide audio output (such as music, voice and the like) through an audio system—for example, an audio system in a motor vehicle—while the portable electronic device is being charged. Generally, when an element is "adapted to" or "configured to" perform a function, that element is capable of carrying out that function. The electronic device may be adapted to provide audio output when the electronic device is the source or store or conveyor of the information to be presented audibly. A portable electronic device may be connected, for instance, to an audio system in a vehicle using a wired connection, which could include a conventional audio jack and plug combination. In some embodiments, the jack and plug can be of the tip-ring-sleeve (TRS) variety, or a tip-ring-ring-sleeve (TRRS) variety, or other various types of wired connectors as are known in the art. Some audio connectors are in the form of 3.5 mm (⅛") miniature plugs and jacks, or other sizes such as 2.5 mm connectors and ¼" connectors.

Furthermore, the electronic device may be charged using a charging accessory while providing audio output to the audio system. For purposes of illustration, charging will be described in terms of supplying or replenishing power to a rechargeable battery via a charging accessory. The charging accessory may be used to power the electronic device (that is, the electronic device may consume power received via the charger instead of or in addition to consuming power received from the battery), charge the battery, or both. For example, in some embodiments, the charging accessory may be coupled to a DC power supply in the vehicle (e.g., a power supply as defined in the ANSI/SAE J563 specification, also referred to as a "cigarette lighter" power supply).

However, charging the electronic device in a motor vehicle during audio output may create undesirable audio noise. In particular, ground current through the portable electronic device and the audio jack connection tends to generate a differential voltage that is generally proportional to the charging current applied to the electronic device. This differential voltage tends to create a significant amount of audio noise (also referred to as "ground noise" or "charging ground current noise") that interferes with the quality of the audio output (and in some cases may render the audio output undecipherable). In other words, ground noise typically has no intrinsic meaning, and ground noise can manifest itself as an audible noise that interferes with meaningful audible output (such as music or voice). The reduction in audio quality can be unsatisfactory and undesirable to a user when the user is trying to (for example) listen to music or participate in a telephone call through the vehicle's audio system while also charging the electronic device at the same time.

Some techniques for charging an electronic device attempt to avoid this ground noise concern. For example, some motor vehicle manufacturers (e.g., BMW) have developed customized audio systems hard wired into the vehicle (for example, using a ground loop isolator, or a differential input stage, etc.) that tend to solve ground noise concerns. However, this approach tends to be specific to each vehicle, and requires hardware modifications to the audio system, which do not address ground noise concerns in other vehicles without this custom circuitry.

In some cases, a wireless connection (e.g., Bluetooth) may be used to send audio from the electronic device to the audio system instead of using a wired connection. Using a wireless connection may eliminate the differential voltage (since the audio system and electronic device are not physically coupled) while still allowing audio to be sent to the audio system during charging. However, sending audio over a wireless connection may adversely affect the quality of the audio signal. In particular, an audio signal that is sent wirelessly is normally transferred in a compressed digital format, which may reduce bandwidth and audio details, leading to a reduction in the audio quality. The wireless signal might also be subject to wireless interference, which may degrade the wireless signal due to interference.

In some cases, charging accessories may be modified to address the ground noise concern. For example, a charging accessory may be modified to have a floating ground to help reduce ground noise effects. This can be accomplished by using a transformer inside the charger that isolates input and output ground. Alternatively, the charging accessory may be coupled to an in-line noise filter (which could be connected between the charging accessory and the electronic device or could be included as part of the charging accessory) that helps to reduce ground noise or by using an audio transformer internally at the output of the electronic device. However, these approaches may also generally be undesirable, as they require either modifying the design of the charging accessory (which does not solve the problem for existing chargers) or using a separate in-line filter or an audio transformer, which is not compatible with the small space and low cost requirements of most portable electronic devices.

Finally, in some cases it may be possible to connect the electronic device to the audio system using a special line-out cable with an internal audio transformer. While a special line-out cable may help address the ground noise concern, it still involves use of a special accessory, which is generally undesirable.

According to at least some of the embodiments as described herein, the concern about differential voltages causing ground noise may be addressed generally without modifying the audio hardware system of a motor vehicle, without modifying a charging accessory, and without using a separate in-line filter or line-out cable.

In particular, according to at least some embodiments an electronic device may include circuitry connected to the output jack of the electronic device that is adapted to address the differential voltage concern. For example, a ground resistor (in some cases a medium value resistor with a resistance between around 50 Ohm to 200 Ohm) may be included on a ground path of the electronic device generally between a ground for the electronic device and a ground return line of the output jack. The ground for a portable electronic device generally represents the ground node for the device, which may be, but need not be, at earth potential. Furthermore, a feedback path may be added to monitor voltage at a point between the ground resistor and the ground return line. The feedback path may allow further compensation for changes to ground potential between the ground resistor and the ground return line based on the monitored line voltage.

In some embodiments, the feedback point may be chosen to be inside an electronic chip if the ground resistor is placed inside this chip and minimal pincount is desired. For improved performance, it may be possible to use the ground connection at the headset jack to eliminate at least some of the ground noise generated on the PCB board.

When an electronic device is configured in this manner, it may be possible to decrease the amount of ground noise due to differential voltage by a significant factor, often by 30-40 dB. Furthermore, this approach can improve audio quality without using another accessory or a customized audio system (e.g., a customized car stereo system in a motor vehicle). Moreover, the approach may be cost effective, as it may not significantly add to the cost of the portable electronic device since it forms part of an already existing circuit within the electronic device.

In particular, the ground resistor will tend to decrease the amount of ground current flowing through the ground return line due to the charging condition, and by selecting suitable resistance values for the ground resistor, it may be possible to decrease the ground current significantly without substantially affecting the audio output. Specifically, the audio system often has high input impedance, which is much greater than the impedance of the ground resistor. As such, the decrease in output amplitude due to the ground resistor on the ground return line may be insignificant as compared to the magnitude of the audio system impedance. Furthermore, by using the ground sense feedback path, it may be possible to compensate for any reduction in amplitude.

More particularly, it may be possible to find resistance values for the ground resistor that sufficiently decrease the ground noise without appreciably decreasing the volume of the audio output. Furthermore, it may be important to include the ground feedback in order to account for the actual voltage at the LINE IN connection, which may be different from the electronic device system ground.

In some embodiments, the audio system may also experience internally generated noise from the motor vehicle, which may also affect the ground potential of the line-in connection and may cause further audio noise issues. However, adding a ground sense connection or feedback path between the ground resistor and the ground return line may compensate for this ground potential noise and thereby improve the fidelity of audio system.

Compared to conventional portable electronic devices, some embodiments as described herein may provide at least 25 dB lower noise in motor vehicle audio systems. In some cases, embodiments as described herein may provide for up to 35 dB lower noise, or in some embodiments up to 45 dB lower noise (or even greater).

Figure 2:
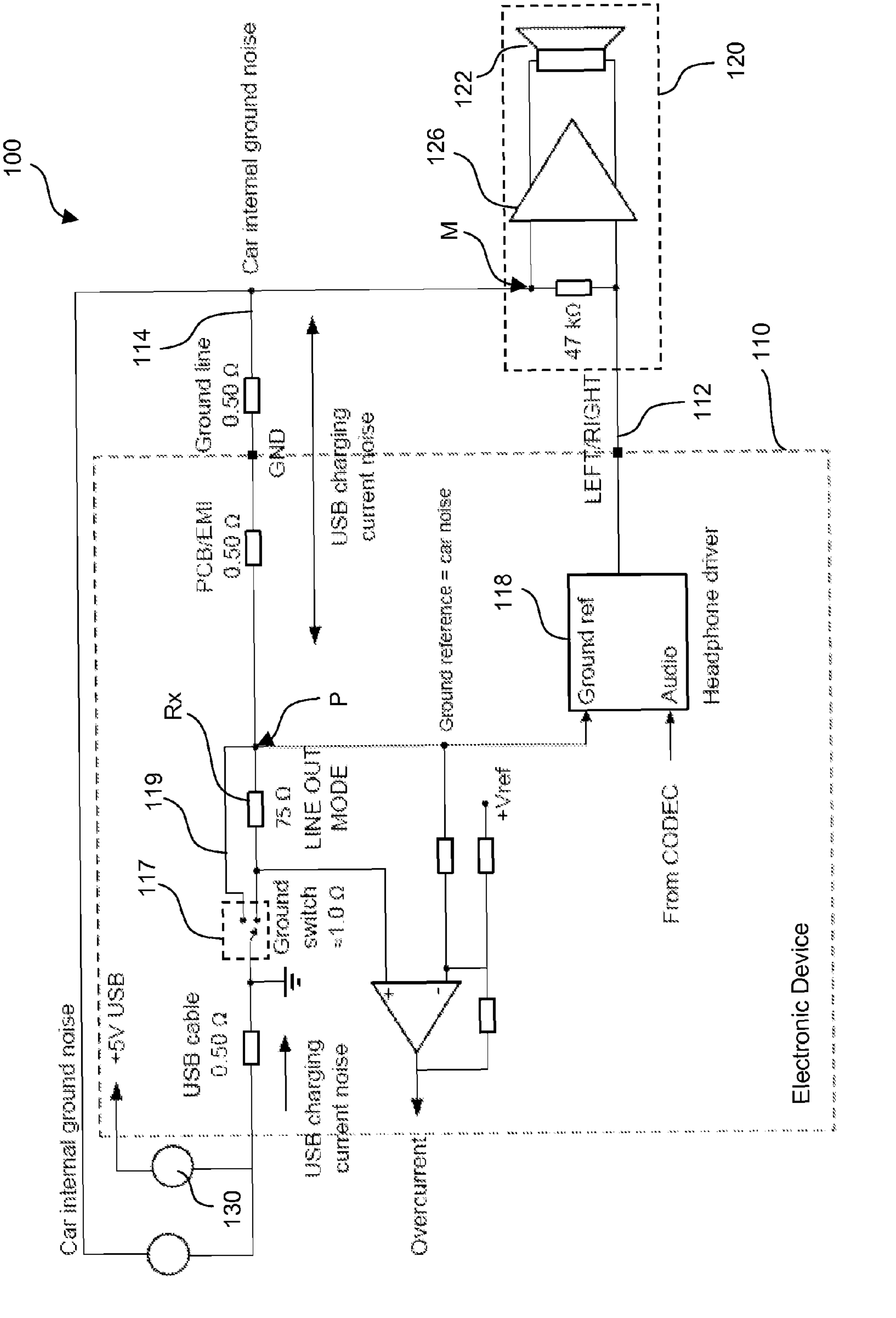
FIG. 2 is another schematic diagram of the audio system of FIG. 1.

Turning now to FIGS. 1 and 2, illustrated therein is a system 100 that includes an electronic device 110, an audio system 120 (e.g., a car stereo in a motor vehicle), and a charging accessory 130 according to one embodiment. Only one channel is shown for simplicity, although in practice more than one channel may be used (e.g., a left channel and a right channel may be used). As the context of the description below will indicate, the circuitry shown in FIGS. 1 and 2 may model actual electronic components as well as some physical effects of the interaction of components.

As shown, the electronic device 110 has an audio jack 111 that includes a line-out 112 and a ground return line 114. The audio jack 111 is adapted to be coupled to the audio system 120 (e.g., using a TRS or TRRS connector) to send audio signals to the audio system 120.

The audio system 120 includes one or more speakers, for example speaker 122 as shown, which may be coupled to an amplifier 126. In some embodiments, the audio system 120 may include only one speaker. In other embodiments, the audio system 120 could include more than two speakers.

In some embodiments, more than one amplifier 126 may be used to drive separate speakers (e.g., two amplifiers may be used for stereo systems with both a left and right channel and two speakers).

During audio playback, audio signals are sent by the electronic device 110 to the audio system 120 via the line-out 112. These audio signals are then amplified by the amplifier 126 and output as audible sound via the speaker 122.

As shown, the system 100 also includes the charging accessory 130. The charging accessory 130 is coupled to a power source 128 (e.g., a DC power supply such as a car battery of motor vehicle), which supplies electrical power to the charging accessory 130 at some voltage level. For example, the power source 128 may supply a charging current $I_c$ of around 0.5 amps to the charging accessory 130 at around 13.8 volts (or around 12 volts).

In turn the charging accessory 130 is adapted to supply power to the electronic device 110 (e.g., +5 Volts at around 1 amp), as indicated generally as current $I_E$, for powering the electronic device 110, charging a battery of the electronic device 110, and with closed return paths of the currents.

The power source 128 may also supply power to the audio system, for example providing current $I_s$ to the audio system 120, which in some cases may be around 2-3 amps at around 13.8 volts.

As shown, the electronic device 110, audio system 120, and charging accessory 130 share a common ground point or node (indicated generally as G). During use, various differential voltages in the system 100 can cause currents (indicated generally as currents $I_1$, $I_2$, $I_3$, and $I_4$), which may function as sources of ground noise and may interfere with audio quality.

In some cases, the first current $I_1$ may be the return of the current $I_S$ for powering the audio system 120 (and which may be between 2-3 amps for example). In some cases, the second current $I_2$ (between the ground point G and the charging accessory 130) may be between about 0.25 and 1 amps, and the third current $I_3$ (between the charging accessory 130 and the electronic device 110) may be between about 0.5 to 2 amps. Finally, the fourth current $I_4$ (also called the ground current) along the ground return line 114 may in some cases be between about 0.1 to 0.3 amps. The value of the fourth current $I_4$ will depend on the ratio between the resistance of the ground return line 114 and other currents flowing in the system 10, although in the ideal case (i.e. for no audio disturbances), the fourth current $I_4$ will be virtually zero and be the sum of the audio return currents.

Generally, these currents $I_1$, $I_2$, $I_3$, and $I_4$ may contribute to ground noise, and may interfere with the quality of audio output from the electronic device 110 and the audio system 120. In particular, the ground current $I_4$ along the ground return line 114 directly contributes to ground noise and may have a detrimental impact on audio quality, while $I_1$, $I_2$ and $I_3$ may change the ground potential of the audio system 120 and thereby also introduce noise.

As shown, a ground resistor Rx may be included in the electronic device 110 between the ground return line 114 and the ground point G. The ground resistor Rx can be used to reduce the effects of ground noise, for example, by reducing or eliminating the ground current $I_4$ as introduced by the charging current $I_E$. More particularly, by including a ground resistor Rx with a suitably selected resistance value (e.g., around 75 ohms in some embodiments), portions of the ground current $I_4$ along the ground return line 114 can be reduced, thus reducing a significant source of ground noise. Of course the return ground current $I_4$ as caused by the audio playback signals, even though small in magnitude, should be maintained.

Generally, the resistance value for the ground resistor Rx should be selected to reduce the impact of the ground current $I_4$ without significantly affecting the quality of the outputted audio. In particular, if the resistance for the ground resistor Rx is too large, the ground resistor Rx can adversely affect the volume of the audio output or in some cases cause distortion due to a limited dynamic headroom.

In some embodiments, the ground resistor Rx may have a resistance of around 75 Ohm. In some embodiment, the ground resistor Rx may have a resistance between around 50 Ohm and 100 Ohm. In some embodiment, the ground resistor Rx may have a resistance between around 100 Ohm and 200 Ohm. In yet other embodiments, the ground resistor Rx may have a resistance of less than 100 Ohm.

In some embodiments, the resistance of the ground resistor Rx may be selected as a percentage of the impedance of the audio system 120 (e.g., in some embodiments less than 1%, less than 0.5%, and so on).

As discussed above, the system 100 may experience internally generated noise in the motor vehicle that can cause further audio issues (e.g., due to the other currents $I_1$, $I_2$, $I_3$ in the system 100). However, it may be possible to at least partially compensate for these noise sources by adding a ground sense connection or feedback loop between the ground resistor and the ground return line 114. This works by sensing the actual potential of the ground from the audio output system (point M) and using this as ground reference for the amplifier 118. If the charging currents flowing between point P and point M have been sufficiently reduced, a measurement of the potential at point P will be almost the same value as the potential at point M and therefore any influence of currents $I_1$, $I_2$ and $I_3$ may be eliminated, further reducing noise.

For example, as shown, the electronic device 110 may be adapted to monitor the voltage level at point P between the ground resistor Rx and the ground return line 114, for example using a headphone driver 118 which outputs audio signals to the audio system along the line-out 112.

Monitoring point P effectively allows the electronic device 110 to indirectly monitor point M in the audio system 120, which in turn can allow the electronic device 110 (specifically the headphone driver 118) to compensate for ground noise effects for at least one of the currents $I_1$, $I_2$, or $I_3$.

In particular, the impedance of the audio system 120 tends to be sufficiently large (e.g., 47 kOhm) as compared to the resistance on the ground line 114 (which may be many orders of magnitude less than the impedance of the audio system 120 such as between around 0.2 Ohms and 1.0 Ohms). As such, the voltage drop between the point M and the point P is almost negligible, and the measurement at point P effectively serves as an estimate of the voltage at point M in the audio system as long as the charging return currents due to the charging current $I_E$ has been sufficiently reduced by the ground resistor $R_X$.

Having a voltage estimate for point M in turn allows the headphone driver 118 to compensate for ground noise, for example, due to the first current $I_1$. This is done by using this measurement at point M as a ground reference for the output driver 118.

In particular, the point M is the used as reference with respect to the audio input, so that the output may be corrected. The output should be corrected so the potential difference between the output of the output driver 118 and the point M is equal to the difference between the audio input and the analog reference ground of the output driver 118.

As such, the electronic device 110 may automatically correct for noise generated along the path between ground point G and point M as a result of the resistances along the ground return line 114 and the currents $I_1$, $I_2$, and $I_3$.

It may be desirable to add a finite amount of resistance to the output of the output driver 118 for stability reasons. In general, when discussing circuit elements that are optional or that may be added or connected or disconnected, such circuit elements may be connected or disconnected physically or electronically (or both). When a component is, for example, connected or disconnected electronically, the component may be physically present and may have an effect on the system—or have its effect on the system nullified or reduced—by controlling one or more switching elements, such as one or more transistors. One example of switching circuitry that can electronically connect or disconnect is described in more detail below.

If automatic detection of input impedance of path 114-112 is desired, this resistance should only be included when the headphone amplifier is active. If the output driver 118 is not part of a codec but is connected to a codec, then the analog ground reference and signal input should both be treated as signal lines, or in some embodiments be implemented using differential signalling to reduce any susceptibility to noise.

As discussed above, it might be desirable to select the resistance value of the ground resistor Rx so as to reduce the impact of the ground current $I_4$ without significantly affecting the quality or amplitude of the outputted audio. However, the ground resistor Rx will have some effect on the audio amplitude. Generally this will have the largest impact if the input impedance of the accessory connected to the audio jack 111 has an impedance in the same range or lower than the resistive value of ground resistor $R_X$.

Accordingly, it may be beneficial to disconnect the ground resistor Rx when compensating for ground noise is not beneficial (e.g., when there is no ground noise because the electronic device 110 is not being charged) or when the resistance of the ground resistor Rx might significantly affect the audio quality (e.g., when the electronic device 110 is coupled to headphones or another accessory and not to an audio system 120 with a high impedance).

In particular, the electronic device 110 may be adapted to detect whether the electronic device 110 is in "line-out" mode (e.g., coupled to a car stereo system or another audio system 120 with a high input impedance) or alternatively is coupled to headphones or another accessory (which typically has a much lower impedance) by monitoring the input impedance detected by the electronic device 110 through the audio jack 111.

As shown in FIG. 2, in some embodiments a switch 117 may be adapted to selectively bypass ground resistor Rx, for example using a bypass line 119. When the electronic device 110 detects a high impedance (indicating that the device is connected to an audio system), the switch 117 can connect the ground resistor Rx to reduce the effects of ground noise. Conversely, if the electronic device 110 detects a low impedance (indicating that the device is connected to headphones or another low impedance accessory), the switch 117 can disconnect the ground resistor Rx using the bypass line 119. In some embodiments the bypass line 119 may have a low resistance value (e.g., 1 Ohm or less) to mitigate voltage drops that might reduce the volume of the audio output, and the ground sense may be used to reduce the effect of the voltage drop significantly. In yet other embodiments, the ground connection may be either on the sleeve pin or the pin next to the sleeve pin (e.g., the second ring on a male audio jack) or on both of them (second ring and sleeve combined into a single contact). In other embodiments, the switch 117 will be implemented with two low resistance (0.1-1 Ohm) switches as shown on FIG. 3 and one higher resistance switch connected (e.g., 5-20 Ohm) to the ground resistor Rx.

Thus, when such a switching scheme is implemented, the electronic device 110 may be operable to compensate for ground noise when coupled to an audio system 120 (e.g., a car stereo system), and may also provide good audio volume when the electronic device 110 is coupled to another accessory, such as headphones.

In some embodiments, the electronic device 110 may be adapted to only activate the ground resistor Rx when the electronic device 110 detects the charging accessory 130 coupled to the electronic device 110. For example, when the charging accessory 130 is not detected, the switch 117 might bypass the ground resistor Rx. This may eliminate the impact of the ground resistor Rx (however small) on the volume of the audio output through the audio system 120.

This has the further advantage in that it reduces the effect of special impedance cases, such as when an accessory first detected connected to the audio jack 111 has a line out connection but later changes impedance to a much lower value. This may happen, for example, if a headset with internal volume control was connected to the audio jack 111.

In yet other embodiments, the current $I_4$ is dynamically monitored. If the value of the current $I_4$ is larger than a certain amount and the ground resistor Rx has already been included in the ground path, this is an indication that a headset with a variable impedance is connected to the audio jack 111 and not a line out connection. In this case the value of the ground resist Rx may slowly be decreased towards zero in order to cope with varying impedance and avoid audio disturbances (e.g., clicking noises).

Controlling the switch 117 based on detection of the charging accessory 130 may also help avoid a "headset collision" concern. In particular, when coupled to headphones, in some cases the electronic device 110 may mistakenly determine that it is coupled to the audio system 120 (e.g., a car stereo with a high impedance) instead of to the headphones. For example, when a headphone accessory is initially set with a low volume using a resistor on the headphones, it may have high impedance (e.g., around 10 kOhm or more). When such a headphone accessory is coupled to the electronic device 110, the electronic device 110 may measure the impedance and mistakenly determine that the headphone accessory is an audio system with high impedance (e.g., the audio system 120). In these cases, the electronic device 110 might connect the ground resistor Rx using the switch 117.

Subsequently, when the user turns up the volume on the headphone accessory (e.g., lowering the impedance of the headphone accessory, in some case to less that 50 Ohms) this may result in distortion and a lower maximum audio output volume caused by the more significant relative impact of the ground resistor Rx.

Figure 3:
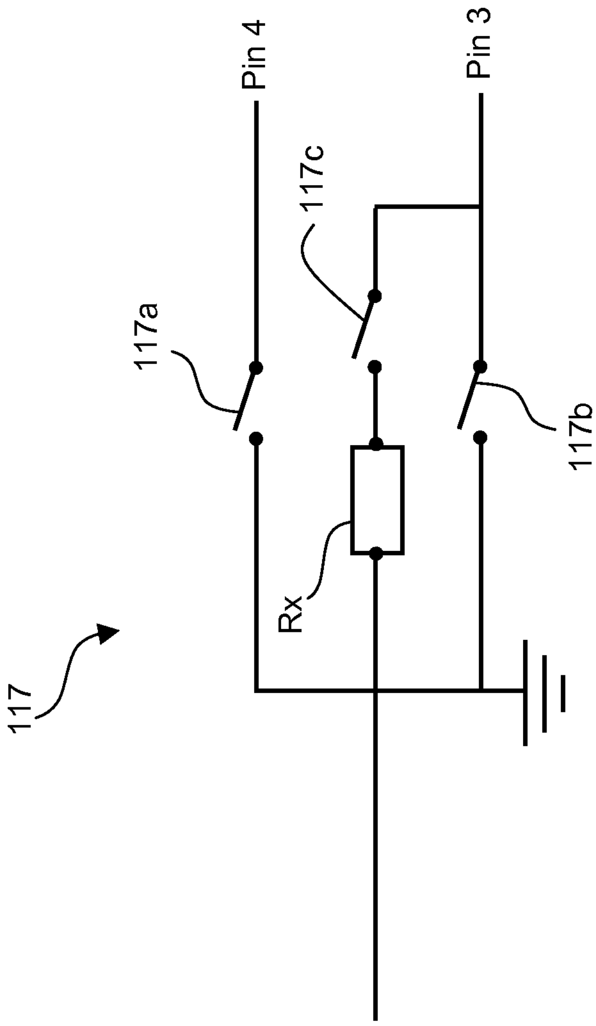
FIG. 3 is a schematic diagram of a switch of the audio system of FIG. 2 for connecting and disconnecting a ground resistor.

Turning now to FIG. 3, one implementation of the switch 117 is shown in greater detail, and which may be adapted to be connected to a TRRS connector. For example, the switch 117 may include a first switching element 117*a* adapted to be coupled to Pin 3 of a TRRS connector and a second switching element 117*b* adapted to be coupled to Pin 4 of a TRRS connector. A third switching element 117*c* may be included to connect the ground resistor Rx.

In some embodiments, one or more of the switching elements 117*a*, 117*b*, and 17*c* may allow the ground resistor Rx to be disconnected by engaging the bypass line 119, or for sensing when an audio system has been connected or disconnected from the audio jack.

As shown, the ground resistor Rx is not connected to pin 4 (sleeve). This allows removal detection even if a special detection pin connected to the tip pin of the male audio jack is non-functional.

The ground switches 117*a* and 117*b* will typically have very low resistance (e.g., between about 0.1 and 1.0 Ohms), while the switch in series with the ground Rx, switch 177*c*, can have a larger resistance and for part of the total desired resistance of the ground resistor Rx. As used herein, the phrase "in series" means substantially in series, in that substantially all of the current passes through particular elements in sequence.

As an example 117*c* could have a resistance of 10 Ohm, while the ground resistor Rx has a resistance of around 65 Ohm, thus providing a total resistance of 75 Ohm when the switch 117*c* is active.

In some embodiments, the switches may be ESD protected using static or dynamic ESD structures that include diodes or transistors (or both).

In some embodiments, when the electronic device 110 detects that it is in "line-out" mode, at least some of the controls of the electronic device 110 may be disabled (e.g., volume, etc.) and the gain on the electronic device 110 may be set at a particular level so as to provide a relatively clean audio signal (e.g., with minimal or at least reduced distortion) via the line-out 112. In other embodiments, the electronic device 110 may set the default line-out volume to a different setting than the default headset volume setting (and which the user may be able to adjust).

A typical commercial line out level is around 300 mVrms full scale. This means that when a user connects the electronic device 110 to a line in amplifier, the electronic device 110 should automatically default to a volume setting that corresponds to a maximum volume around this value. This has the advantage in that if the user has set a different (and typically lower) volume setting on the electronic device 110, it will not be necessary to adjust to the better and higher volume for automatic matching to the volume of the audio system 120. This will tend to give a better signal-to-noise (SNR) ratio and may avoid some undesired user scenarios, such as when removing the line out connection after having increased the volume on the audio system 120 and changing to radio playback.

In some embodiments, placing the ground resistor Rx in the ground path (e.g., between the ground return line 114 and the ground point G), may help to protect an accessory chip against excessive overcurrents, or if overcurrents are detected, may provide extra resistance along the ground path and thereby protect the chip and the electronic device 110 under fault conditions.

Therefore, if an overcurrent condition is detected due to fault conditions within or outside the chip, the chip may automatically switch the ground connection to include the ground resistor Rx.

In yet other embodiments, the accessory chip may completely disconnect the ground connection for safety reasons by disconnecting all three switches 117*a*, 117*b* and 177*c*.

Implementation of one or more embodiments of the concept described herein may realize one or more advantages, some of which have already been mentioned. The approaches described herein can be implemented without customized audio systems. When applied with a motor vehicle that has such a customized system, the concepts described herein generally have no adverse effects; consequently, the systems and apparatus as described herein need not be modified specifically depending upon the audio system. Furthermore, a user may realize significant benefits in audio quality that may come with a wired connection without sacrificing bandwidth or other losses or trade-offs that may accompany a wireless connection. In addition, the concepts described herein can be implemented in an economical, compact and lightweight way, which may be beneficial for portable electronic devices in general and for handheld devices in particular (where considerations of size and weight may be particularly important).

Various embodiments may be beneficial in their adaptability to many different kinds of electronic devices, chargers and audio systems. In some embodiments, addition of space-consuming hardware or electrical pins can be avoided. A user may charge an electronic device with less concern that charging will adversely affect the quality of the audio. As a potential side benefit, some embodiments may reduce noise that is not related to charging.

While the above description provides examples of one or more apparatus, methods, or systems, it will be appreciated that other apparatus, methods, or systems may be within the scope of the present description as interpreted by one of skill in the art.

The invention claimed is:

1. An electronic device adapted to provide audio output via an audio system, the electronic device comprising:

an audio jack adapted to be coupled to the audio system, the audio jack including a line-out for sending audio signals to the audio system and a ground return line;

a ground resistor between the ground return line and a ground node, the resistance of the ground resistor selected to reduce charging ground current noise on the ground return line without significantly adversely affecting the quality of the audio output;

a feedback loop coupled to the line-out and adapted to monitor voltage at a point between the ground resistor and the ground return line to compensate for at least one other noise source; and a switch for disconnecting the ground resistor, wherein the switch is adapted to connect the ground resistor when the electronic device is being charged, and disconnect the ground resistor when the electronic device is not being charged.

2. An electronic device adapted to provide audio output via an audio system, the electronic device comprising:

an audio jack adapted to be coupled to the audio system, the audio jack including a line-out for sending audio signals to the audio system and a ground return line;

a ground resistor between the ground return line and a ground node, the resistance of the ground resistor selected to reduce charging ground current noise on the ground return line without significantly adversely affecting the quality of the audio output;

a feedback loop coupled to the line-out and adapted to monitor voltage at a point between the ground resistor and the ground return line to compensate for at least one other noise source; and a switch for disconnecting the ground resistor, wherein the switch is adapted to connect the ground resistor when the electronic device determines that the electronic device is connected to the audio system, and disconnect the ground resistor when the electronic device determines that the electronic device is not connected to the audio system.

3. The electronic device of claim 2, wherein the electronic device detects impedance at the audio jack to determine if the electronic device is connected to the audio system.

4. The electronic device of claim 1, wherein the electronic device is adapted to be charged using a charging accessory.

5. The electronic device of claim 1, wherein the feedback loop is coupled to a headphone driver that provides the audio signals to the audio system along the line-out.

6. The electronic device of claim 1, wherein the audio system is an audio system in a motor vehicle.

7. The electronic device of claim 1, wherein the audio jack is adapted to be coupled to at least one of a tip-ring-sleeve connector (TRS) and a tip-ring-ring-sleeve (TRRS) connector to provide the audio signals to the audio system.

8. The electronic device of claim 1, wherein the resistance of the ground resistor is between around 50 Ohm and around 200 Ohm.

9. The electronic device of claim 1, wherein the resistance of the ground resistor is around 75 Ohm.

10. A system adapted to provide audio output, comprising:

an audio system having at least one speaker for outputting audio and being coupled to a power source;

a charging accessory coupled to the power source;

an electronic device, the electronic device having:

an audio jack adapted to be coupled to the audio system, the audio jack including a line-out for sending audio signals to the audio system and a ground return line;

a ground resistor between the ground return line and a ground node, the resistance of the ground resistor selected to reduce ground current on the ground return line when the electronic device is being charged by the charging accessory without significantly adversely affecting the quality of the audio output;

a feedback loop coupled to the line-out and adapted to monitor voltage at a point between the ground resistor and the ground return line to compensate for at least one other noise source in the system; and a switch for disconnecting the ground resistor;

wherein the switch is adapted to disconnect the ground resistor when the electronic device is not being charged by the charging accessory.

11. The system of claim 10, wherein the switch is adapted to connect the ground resistor when the electronic device determines that the electronic device is connected to the audio system, and disconnect the ground resistor when the electronic device determines that the electronic device is not connected to the audio system.

12. The system of claim 11, wherein the electronic device detects impedance at the audio jack to determine if the electronic device is connected to the audio system.

13. The system of claim 10, wherein the feedback loop is coupled to a headphone driver on the electronic device that provides the audio signals to the audio system along the line-out.

14. The system of claim 10, wherein the audio system is an audio system in a motor vehicle.

15. The system of claim 10, wherein the audio jack of the electronic device is adapted to be coupled to at least one of a tip-ring-sleeve connector (TRS) and a tip-ring-ring-sleeve (TRRS) connector to provide the audio signals to the audio system.

16. The system of claim 10, wherein the ground resistor has a resistance of between around 50 Ohm and around 200 Ohm.

17. The electronic device of claim 2, wherein the electronic device is adapted to be charged using a charging accessory.

18. The electronic device of claim 2, wherein the feedback loop is coupled to a headphone driver that provides the audio signals to the audio system along the line-out.

19. The electronic device of claim 2, wherein the audio system is an audio system in a motor vehicle.

20. The electronic device of claim 2, wherein the audio jack is adapted to be coupled to at least one of a tip-ring-sleeve connector (TRS) and a tip-ring-ring-sleeve (TRRS) connector to provide the audio signals to the audio system.

21. The electronic device of claim 2, wherein the resistance of the ground resistor is between around 50 Ohm and around 200 Ohm.

22. The electronic device of claim 2, wherein the resistance of the ground resistor is around 75 Ohm.

23. The system of claim 10, wherein the resistance of the ground resistor is around 75 Ohm.

* * * * *